UNITED STATES PATENT OFFICE.

JOSEPH FLACHSLAENDER AND KARL PAUL GRÄLERT, OF ELBERFELD, AND MAX BUFF, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

GREEN SULFUR DYE.

1,081,598. Specification of Letters Patent. Patented Dec. 16, 1913.

No Drawing. Application filed October 3, 1912. Serial No. 723,702.

*To all whom it may concern:*

Be it known that we, JOSEPH FLACHSLAENDER and KARL PAUL GRÄLERT, residing at Elberfeld, and MAX BUFF, residing at Vohwinkel, near Elberfeld, Germany, doctors of philosophy, chemists, citizens of the German Empire, have invented new and useful Improvements in Green Sulfur Dye, of which the following is a specification.

Our invention relates to the manufacture and production of new green sulfur colors which are obtained by treating with alkali polysulfids the leucoindophenols of the formula:

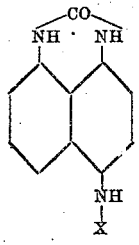

(in which X means a phenolic radical) or the corresponding indophenols. The melt can also be carried out with the addition of copper or a copper compound.

The new dyes are after being dried and pulverized dark powders soluble in a solution of sodium sulfid generally with a green coloration and soluble with difficulty in concentrated sulfuric acid with a greenish-blue coloration. They dye cotton in green shades distinguished by their fastness to boiling and to light.

In order to illustrate the new process more fully the following example is given, the parts being by weight:—60 parts of calcined sodium sulfid (60 per cent. Na₂S), 50 parts of sulfur, 36 parts of the leucoindophenol (obtained from the leucoindophenol derived from 1.8-naphthylenediamin and dichloro-para-aminophenol and treatment with phosgen), 5 parts of copper sulfate and 150 parts of alcohol are boiled during 48 hours in a vessel provided with a reflux condenser. The alcohol is then distilled off, the residue is dissolved in water and the dyestuff is isolated from its solution by precipitation with air or acid. The new coloring matter is after being dried and pulverized a dark powder soluble in a sodium sulfid solution with a dark green coloration. It is soluble with difficulty in concentrated sulfuric acid with a greenish-blue coloration. It dyes cotton in pure green shades fast to light and to boiling. In the same way leucoindophenol bases substituted in the benzene nucleus by other substituents *e. g.* methyl, chlorin, etc., or the corresponding indophenols can be used.

The above mentioned quantities of sodium sulfid and of sulfur as well as the temperature and the duration of the reaction can be varied within wide limits.

We claim:—

1. The herein described new sulfur dyes being sulfur-containing derivatives of leucoindophenols of the formula:

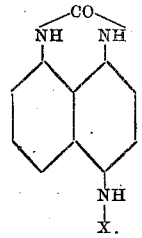

in which X means a phenolic radical, which are after being dried and pulverized dark powders being soluble in a solution of sodium sulfid generally with a green coloration; being with difficulty soluble in concentrated sulfuric acid with a greenish-blue coloration; and dyeing unmordanted cotton green shades fast to light and to boiling; substantially as described.

2. The herein described new sulfur dye being a sulfur-containing derivative of the leucoindophenol of the formula:

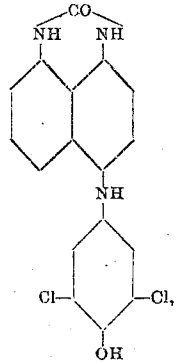

which dye is after being dried and pulverized a dark powder soluble in a sodium sulfid solution with a dark green coloration; soluble with difficulty in concentrated sulfuric acid with a greenish-blue coloration; and dyeing unmordanted cotton in pure green shades fast to light and to boiling, substantially as described.

In testimony whereof we have hereunto set our hands in the presence of two subscribing witnesses.

JOSEPH FLACHSLAENDER. [L. S.]
    KARL PAUL GRÄLERT. [L. S.]
    MAX BUFF. [D. S.]

Witnesses:
  ALBERT NUFER,
  GUSTAVO NAVARRETE.